United States Patent [19]

Hauser et al.

[11] Patent Number: 5,557,931
[45] Date of Patent: Sep. 24, 1996

[54] CHARGE PUMP FOR AXLE DRIVING APPARATUS INCLUDING HYDROSTATIC TRANSMISSION

[75] Inventors: Ray Hauser, Decatur; Daryl Smothers, Sullivan; John Schreier, Villa Grove, all of Ill.

[73] Assignee: Hydro-Gear Limited, Limited Partnership, Sullivan, Ill.

[21] Appl. No.: 451,162

[22] Filed: May 26, 1995

Related U.S. Application Data

[63] Continuation of Ser. No. 394,144, Feb. 24, 1995.

[51] Int. Cl.[6] ............................. F16D 31/02; F16D 39/00
[52] U.S. Cl. ................................ 60/455; 60/486; 60/488
[58] Field of Search ......................... 60/488, 486, 455, 60/487, 454

[56] References Cited

U.S. PATENT DOCUMENTS

| | | | |
|---|---|---|---|
| 2,777,286 | 1/1957 | Badalini | 60/488 |
| 2,975,597 | 3/1961 | Arz . | |
| 3,175,363 | 3/1965 | Molly . | |
| 3,213,616 | 10/1965 | Reinke . | |
| 3,279,172 | 10/1966 | Kudo et al. . | |
| 3,360,933 | 1/1968 | Swanson et al. . | |
| 3,486,335 | 12/1969 | Kern et al. | 60/488 |
| 4,041,703 | 8/1977 | Knapp | 60/486 X |
| 4,189,921 | 2/1980 | Knapp . | |
| 4,274,257 | 6/1981 | Koch . | |
| 4,348,864 | 9/1982 | Ichimura . | |
| 4,366,671 | 1/1983 | Chichester . | |
| 4,606,428 | 8/1986 | Giere . | |
| 4,627,237 | 12/1986 | Hutson . | |
| 4,691,802 | 9/1987 | Ishimori et al. . | |
| 4,856,264 | 8/1989 | Nishimura et al. . | |
| 4,864,823 | 9/1989 | Ikejiri et al. | 60/488 |
| 4,922,717 | 5/1990 | Furumoto et al. | 60/488 X |
| 4,967,555 | 11/1990 | Maki et al. | 60/487 X |
| 5,031,403 | 7/1991 | Okada | 60/487 X |
| 5,058,382 | 10/1991 | Inoue et al. | 60/488 |
| 5,060,477 | 10/1991 | Hayashi et al. | 60/488 |
| 5,146,748 | 9/1992 | Okada | 60/455 X |
| 5,317,936 | 6/1994 | Shiba et al. | 60/487 X |
| 5,356,347 | 10/1994 | Komura . | |
| 5,377,487 | 1/1995 | Azuma et al. | 60/487 |

FOREIGN PATENT DOCUMENTS 1126363  9/1968  United Kingdom .

OTHER PUBLICATIONS

Eaton Hydraulics Division, Hydrostatic Transaxle Series 850 parts information.
Daikin Oil Hydraulic Equipment, BDX Series Hydrostatic Transmission.

*Primary Examiner*—John E. Ryznic
*Attorney, Agent, or Firm*—Robert E. Browne; Thomas C. McDonough; Gary R. Jarosik

[57] ABSTRACT

Means for connecting auxiliary pumps and charge pumps to an axle driving apparatus to transfer power from a light duty vehicle engine to an output axle, wherein the charge and/or auxiliary pumps are mounted to the external housing for an integrated hydrostatic transmission or to the external housing for a hydrostatic transmission which is connected to separate axle mechanisms.

15 Claims, 21 Drawing Sheets

CHARGE PUMP FOR AXLE DRIVING APPARATUS INCLUDING HYDROSTATIC TRANSMISSION

This application is a continuation of application Ser. No. 08/394,144, filed Feb. 24, 1995, pending.

BACKGROUND OF THE INVENTION

This invention relates to charge pumps and other auxiliary pumps used on integrated hydrostatic transmissions ("IHT") and hydrostatic transmissions ("HST") for use in light duty applications. An HST can either have its own housing and be attached to an axle driving apparatus, or it can be incorporated within a housing that includes the components of the axle driving apparatus. A unit that contains an HST within the housing of an axle driving apparatus is often referred to as an integrated hydrostatic transaxle ("IHT"). The operation of such units is described in U.S. Pat. Nos. 5,201,692 and 5,314,387, the terms of which are incorporated by reference.

SUMMARY OF THE INVENTION

This invention presents a unique and novel manner of providing and mounting charge pumps and auxiliary pumps for both IHTs or stand-alone HSTs that are mounted to a separate axle driving apparatus. As described in the '692 patent, an IHT, which includes an HST, generally comprises a pump that receives and is rotated by an input shaft driven by the vehicle engine. The pump includes a plurality of pistons that contact a swashplate to cause axial movement thereof when the pump rotates. The pump is hydraulically connected to a motor, which is similar in construction to the pump. The motor receives hydraulic fluid from the pump, and movement of the motor pistons against a swashplate causes rotation of the motor, which is connected to and drives an output shaft. The hydraulic connection between the pump and motor is a closed circuit; however, in any such circuit there will be deliberate and incidental leakage due to lubrication requirements, the high pressure of the hydraulic fluid and manufacturing tolerances. Thus, the HST requires a mechanism to replace fluid leaked from the closed circuit. This replacement fluid is commonly called make-up fluid.

In present HST designs, the pump and motor are often mounted on a center section that includes the hydraulic circuit therein. The hydraulic circuit includes two sides: a high pressure side and a low pressure side. The low pressure side is sometimes referred to as the vacuum side. These two sides are reversed when the vehicle motion is changed from forward to reverse.

The center section is generally mounted in a housing, and the housing provides a hydraulic fluid sump. Make-up fluid is brought into the low pressure side of the hydraulic circuit from the sump. In the preferred embodiment, this is accomplished through check valves mounted directly into the center section. The check valves may also be in a separate plate that is in communication with the center section, as shown in the '692 patent. This system often does not provide sufficient fluid flow into the low pressure side of the circuit to replace the fluid leakage, and a charge pump may be used to assist in this process. In addition, the use of an auxiliary pump to supply pressurized hydraulic fluid for various purposes is generally known. This invention provides for an efficient manner of mounting a charge pump and, in some cases, an auxiliary pump, external to the HST housing but still in communication with the hydraulic circuit in the center section. In some embodiments the functions of the charge pump and the auxiliary pump are performed by the same structure.

The external auxiliary/charge pump arrangement disclosed herein confers significant benefit with respect to accessibility on the hydraulic system. The external auxiliary/charge pump is accessible without disassembling the unit, thereby allowing addition, replacement or upgrade of the auxiliary/charge pump. Previous auxiliary/charge pump configurations were not accessible without disassembly of the HST or IHT.

The external auxiliary/charge pump allows the potential to access pressurized hydraulic fluid. The external charge pump cover can be easily configured to include simply hydraulic fittings, and pressurized hydraulic fluid can then be accessed and used for auxiliary functions. Internal auxiliary/charge pumps, in comparison, generally require a complex series of chambers, connections and fittings in order for fluid to be accessible exterior to the housing.

Additional benefits and features of this invention will be disclosed in the description of the drawings.

DETAILED DESCRIPTION OF THE EMBODIMENTS

Figure 1:
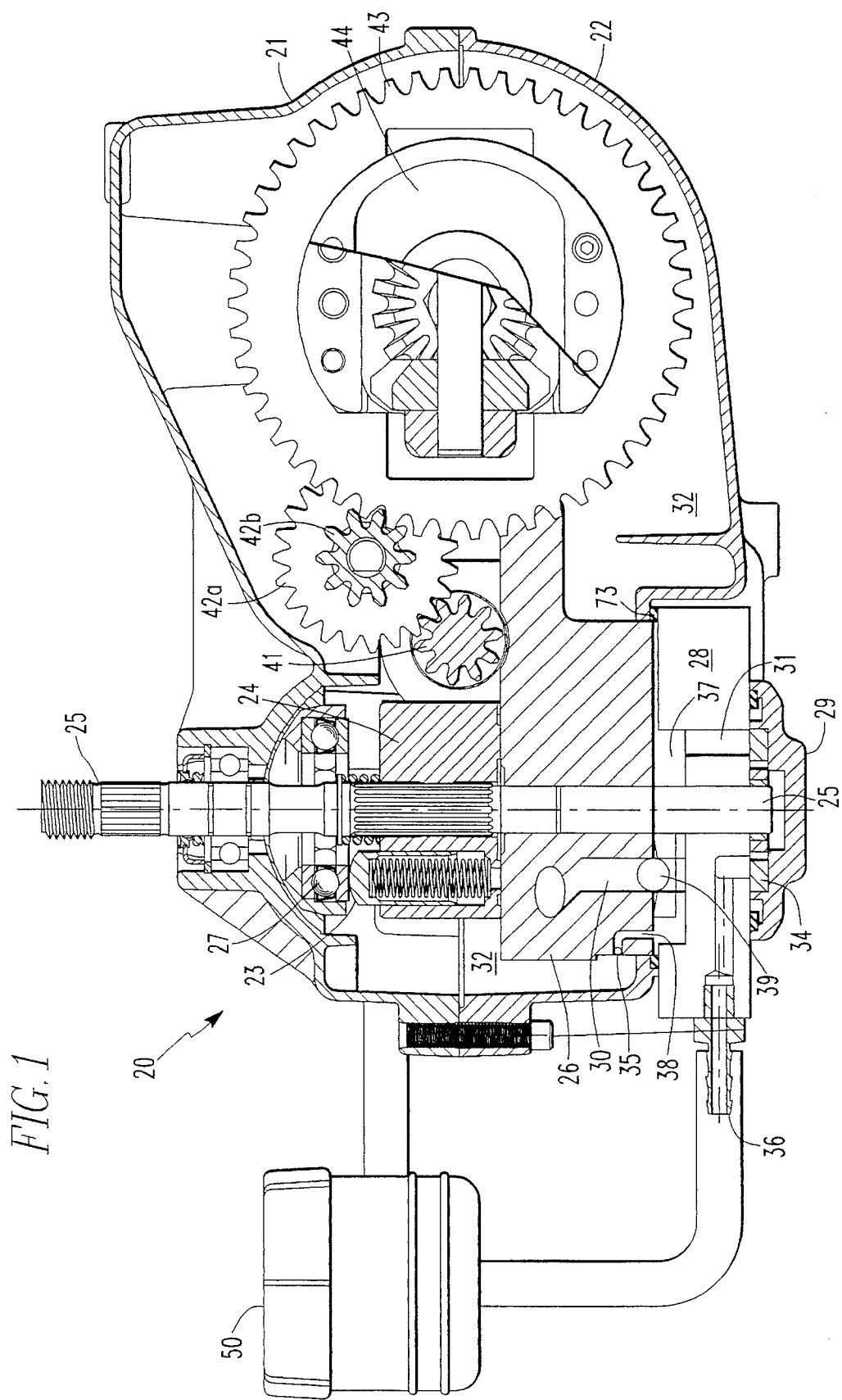
FIG. 1 is a sectional side view of a charge pump and IHT in accordance with the present invention.
Figure 2:
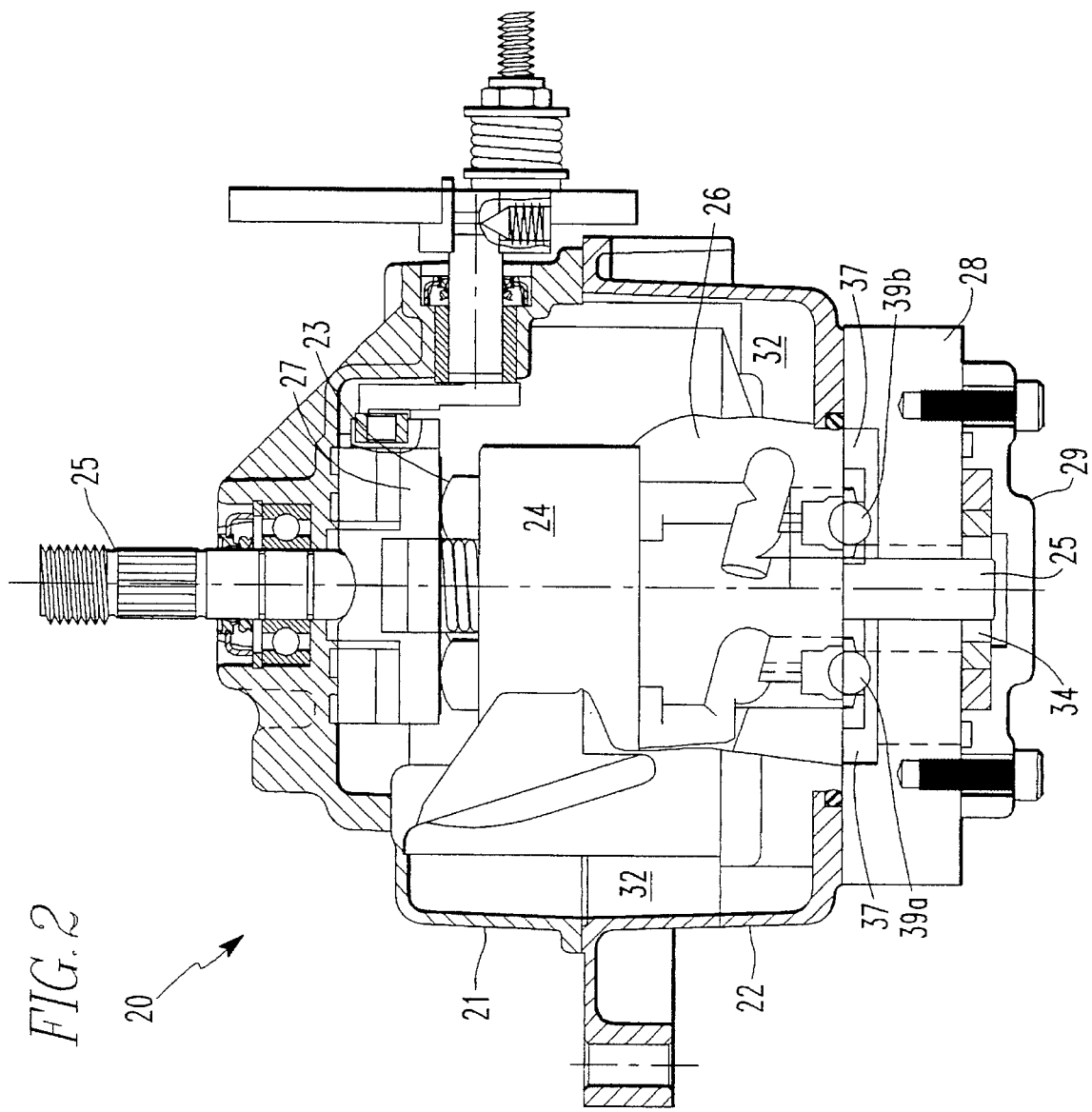
FIG. 2 is a sectional end view of the IHT shown in FIG. 1.
Figure 3:
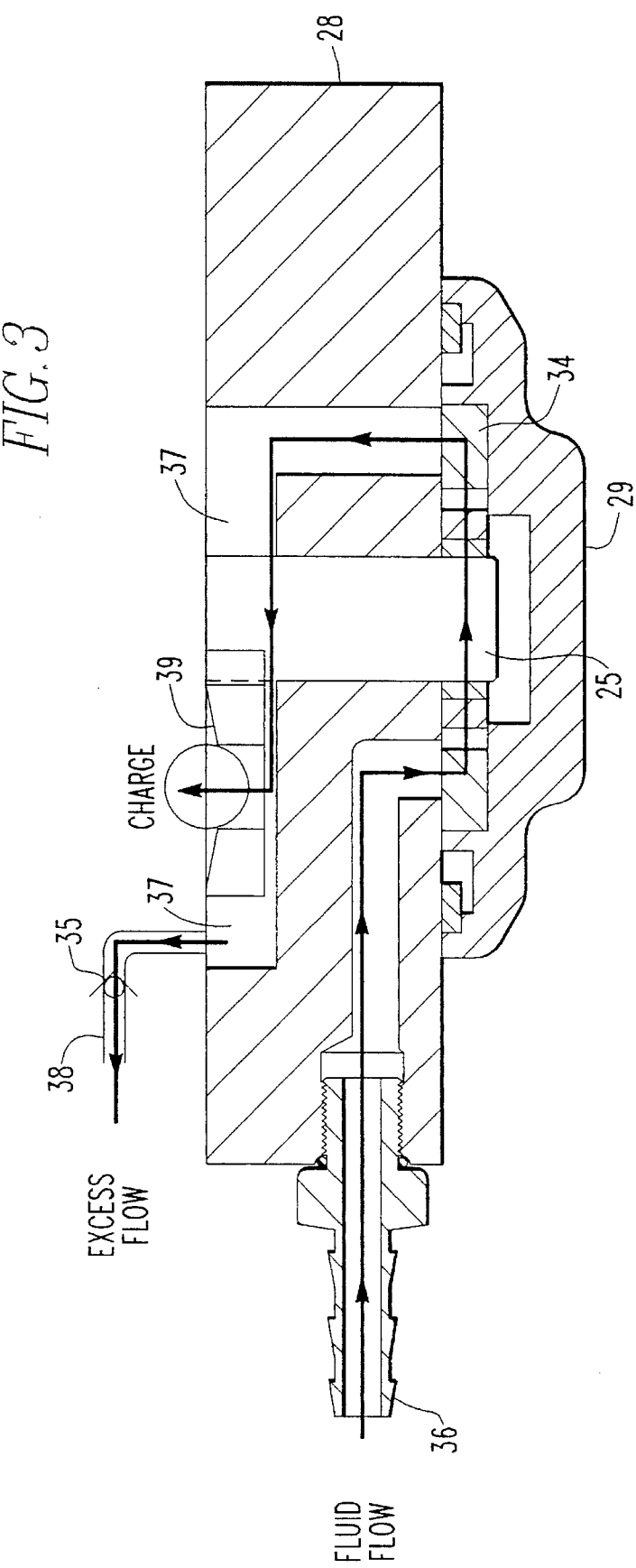
FIG. 3 is a sectional side view of the porting plate and charge pump of the IHT shown in FIG. 1, with a typical hydraulic fluid flow path shown.
Figure 4:
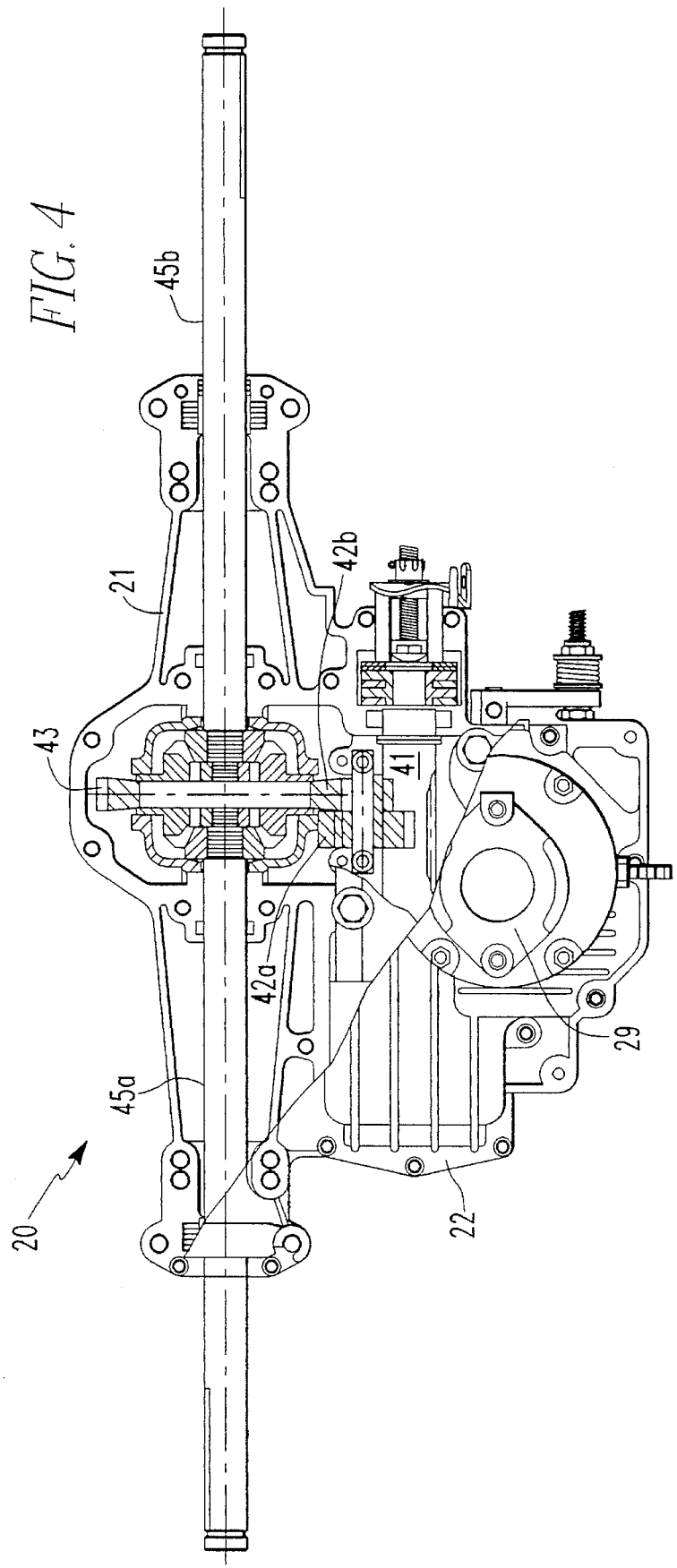
FIG. 4 is a partial sectional bottom plan view of the IHT shown in FIG. 1, with the lower housing and charge cover partially cut away.
Figure 5:
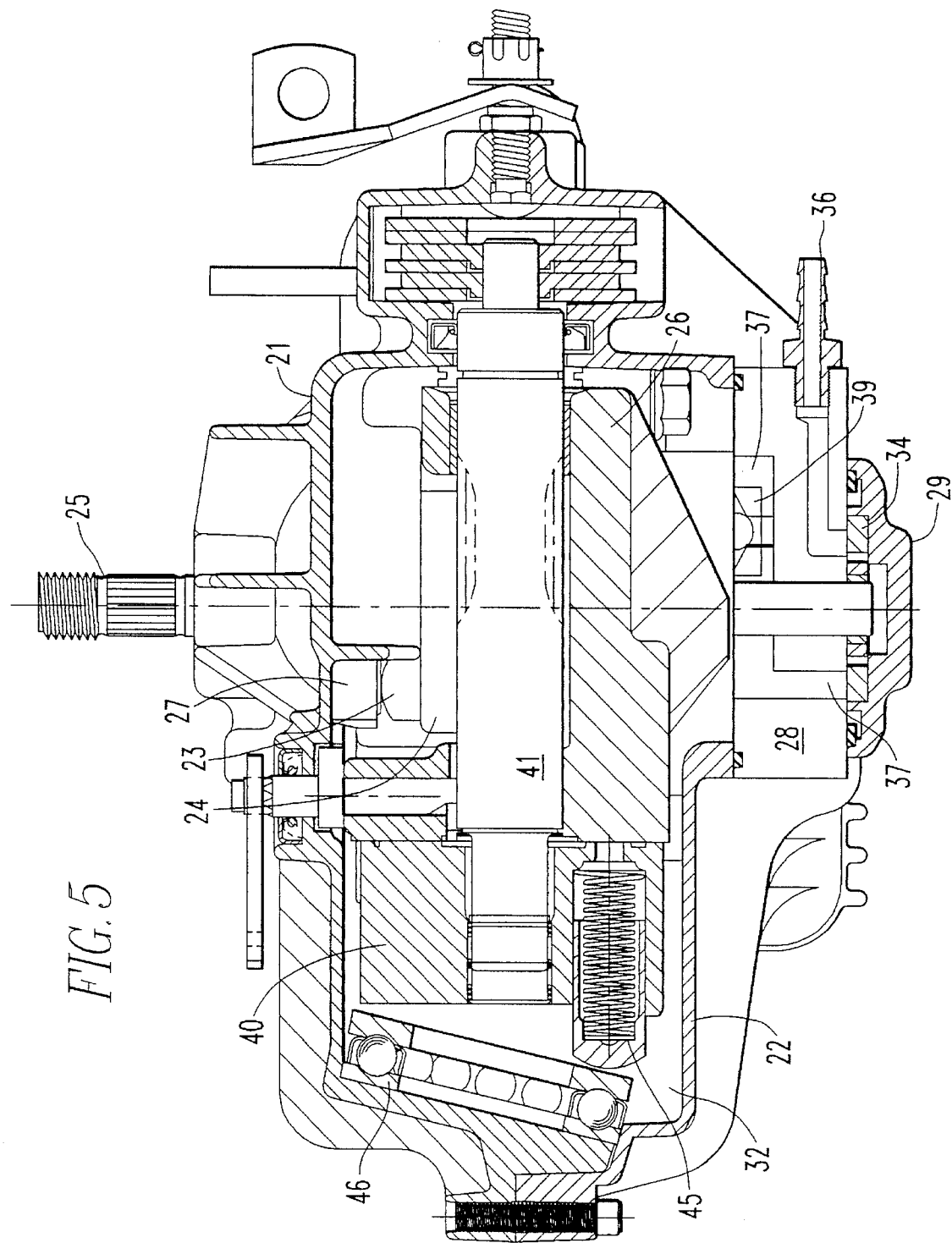
FIG. 5 is a sectional orthogonal side view of the IHT shown in FIG. 1.

A charge pump embodiment of the invention incorporated on an IHT will be described in accordance with the accompanying drawings. FIGS. 1 through 5 illustrate an IHT configured with a horizontally split housing with upper housing 21 and lower housing 22. The invention does not require any specific housing configuration, and all known configurations can be accommodated. All specifics of an IHT are not shown in these figures, as the general operation of an IHT is known in the art.

Pump 24 is disposed on center section 26 and receives input shaft 25, which communicates with and is driven by a vehicle engine (not shown). Center section 26 includes internal porting 30 that hydraulically connects pump 24 and motor 40. Pump pistons 23 engage adjustable swashplate 27 to create pressure within center section internal porting 30. Housings 21 and 22 form a sump or reservoir 32 external to center section 26. Motor 40 is connected to and drives output shaft 41, which in turn drives gear 42a, which is connected to gear 42b, which then drives gear 43 and the remaining gears of differential 44. Differential 44 is in turn operatively connected to the output drive axles 45a and 45b of the vehicle. The specifics of the output gearing and differential are not essential to this invention and are disclosed in the '387 patent.

Figure 7:
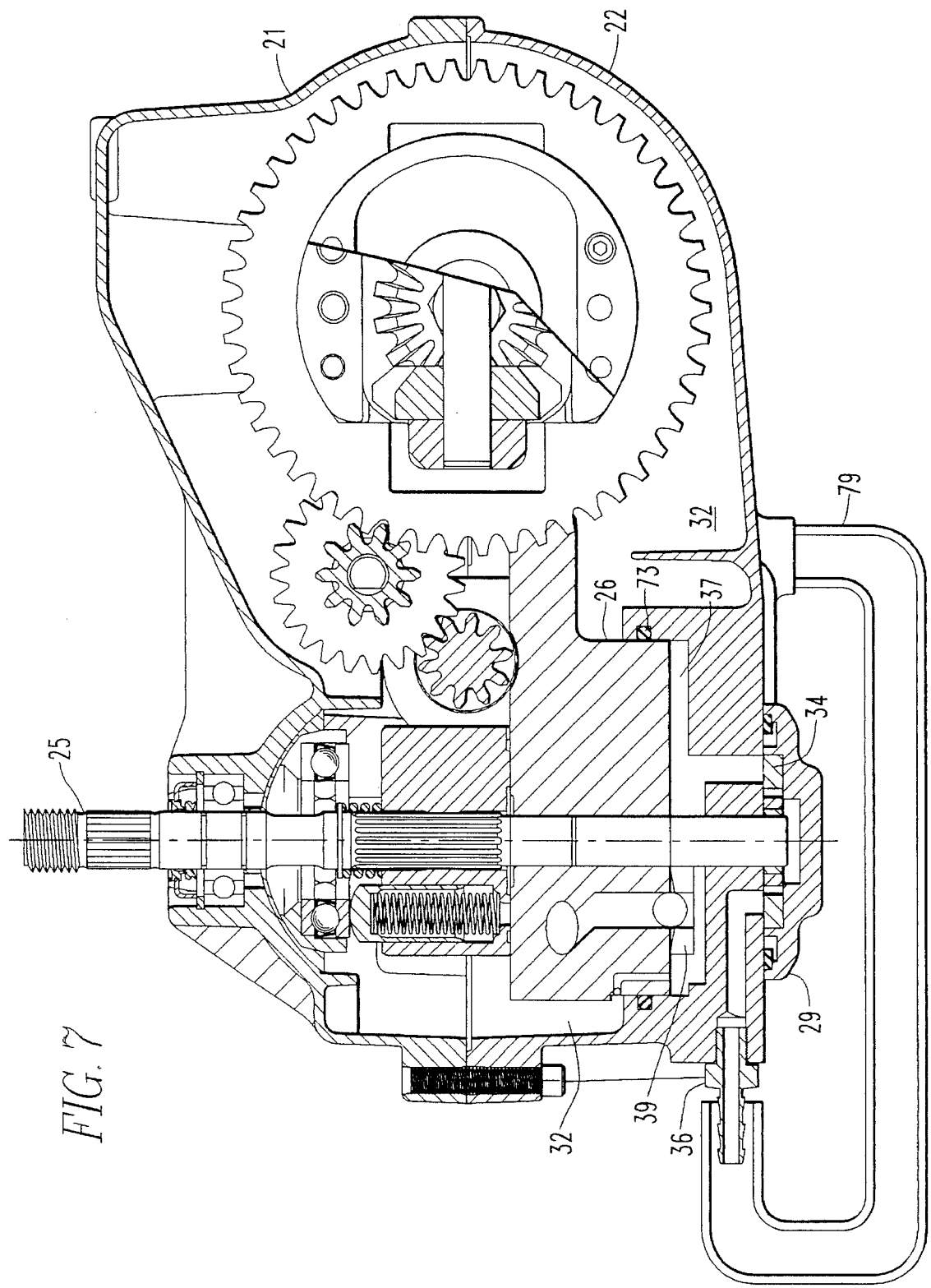
FIG. 7 is a sectional side view of another embodiment of an IHT in accordance with the present invention, with the porting plate incorporated as a part of the lower housing and a sump to sump transfer.
Figure 22:
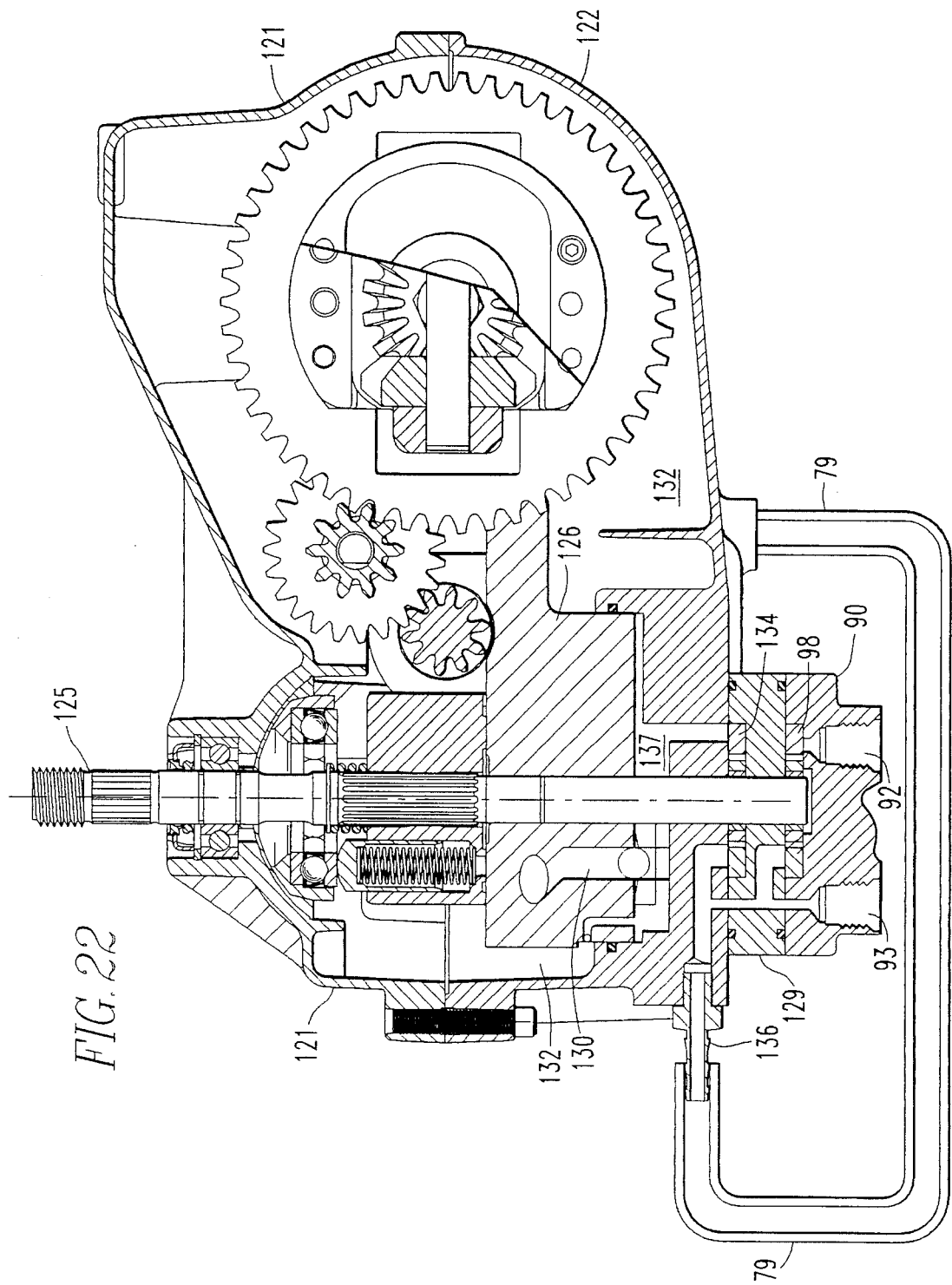
FIG. 22 is a sectional side view of a further embodiment of an IHT incorporating separate charge and auxiliary pumps.

The charge pump includes an inlet porting plate 28 external to the lower housing 22 at the external surface thereof, i.e., attached to the lower housing 22. Porting plate 28 is mounted so that its interior surface is in close proximity to center section 26. Gerotor housing 29, which is also known as a charge cover, is attached to the external surface of inlet porting plate 28, and gerotor set 34 is held in position by charge cover 29 and input shaft 25. This embodiment also includes mounting the porting plate 28 on other housing elements, or parts that may be labeled by other nomenclatures, that would perform functions similar to the described upper and lower housings. Porting plate 28 includes an inlet 36 that is connected to an external reservoir 50 that contains hydraulic fluid and which is typically mounted on a supporting member of the vehicle to which the IHT is mounted. Reservoir 50 is in communication with and receives hydraulic fluid from sump 32. Inlet 36 could also be in communication with and receive fluid from sump 32 instead of reservoir 50, as shown in FIGS. 7 and 22, where hose 79 is used to connect inlet 36 and sump 32. Inlet 36 could also be connected directly to sump 32.

Input shaft 25 extends through pump 24 and center section 26 to drive gerotor set 34, which is of a standard design known in the art. Rotation of gerotor set 34 by shaft 25 creates a low pressure or suction at inlet 36 that remains constant regardless of the forward or reverse status of the HST. The porting plate 28 also includes fluid passage 31 in communication with gerotor set 34. The action of the gerotor will cause fluid forced from the gerotor set into passage 31 to become pressurized. Thus, fluid is drawn through inlet 36 by the suction created by rotation of gerotor 34; the pressurized fluid is then forced into passage 31 and then into gallery 37. Gallery 37 is formed and defined by the interface between the inlet porting plate 28 and the center section 26. In the embodiment shown in FIG. 1, lower housing 22 includes an opening for the bottom surface of center section 26 to be approximately flush with the external bottom surface of lower housing 22. The attachment location of center section 26 in upper housing 21 establishes the position of the center section 26. Other embodiments with different split lines to the housing elements would have a similar opening. The position of the interface between the center section and the porting plate is not critical. In the embodiment shown in FIG. 1, the interface is flush with the external housing, but may move from that position in other embodiments.

Figure 6:
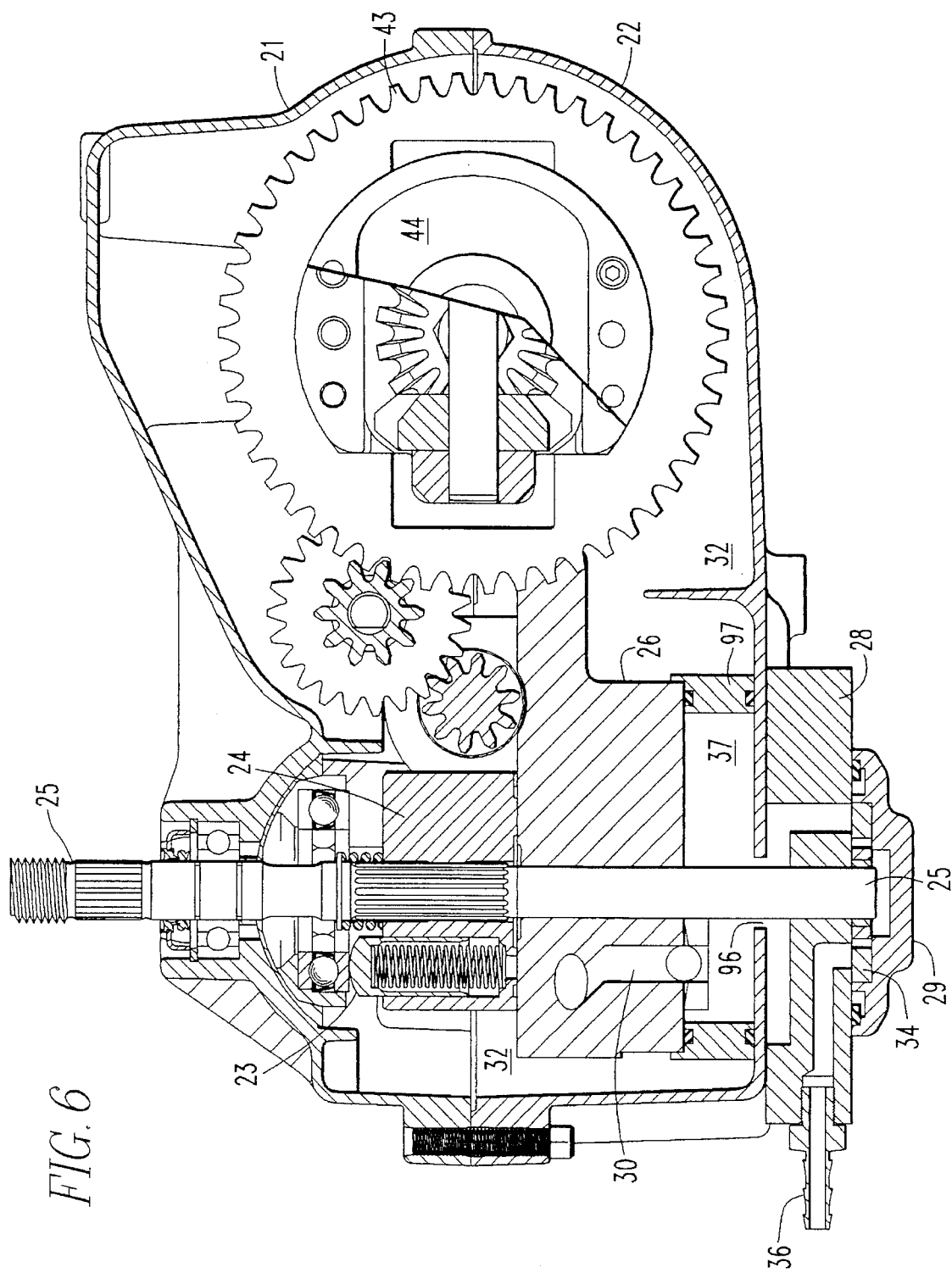
FIG. 6 is a sectional side view of another embodiment of an IHT in accordance with the present invention, with the center section enclosed in the housing and the porting plate mounted to the exterior of the housing.

In an alternative embodiment shown in FIG. 6, center section 26 could be mounted entirely within the IHT housing and inlet porting plate 28 would then be mounted on the external surface of lower housing 22. The charge pump is then connected to internal porting 30 of center section 26 with a lower housing passage 96 and a gallery 37 formed inside the lower housing by a gallery housing 97.

FIG. 7 shows another embodiment of this invention, wherein the porting plate 28 has been integrally formed with the lower housing 22. Center section 26 is in communication with internal surface 99 of lower housing 22. Gallery 37 for the hydraulic fluid is formed and defined by the lower surface of center section 26 and the internal surfaces of lower housing 22. An o-ring 73 is used to aid in positioning and seating these elements and prevents leakage of hydraulic fluid from gallery 37. The principal benefit of this embodiment is the reduction in complexity by the elimination of a separate porting plate. In the embodiment shown in FIG. 1, o-ring 73 seals gallery 37 from the interface between porting plate 28 and lower housing 22 as well as from sump 32. With the integration of porting plate 28 and lower housing 22 into a single piece, the requirement to seal between these two is eliminated, which thus increases the reliability of the IHT.

In the embodiment shown in FIGS. 1–5, check valves 39a and 39b are operatively connected to internal porting 30 of center section 26. As shown in this embodiment, check valves 39a and 39b may be included in plugs that are threaded directly into the surface of center section 26. Alternatively, they may be located in a separate plate that is then secured to center section 26.

The two check valves 39a and 39b each communicate with a different side of the internal hydraulic porting 30. As previously stated, the hydraulic circuit, including internal hydraulic porting 30, consists of a high pressure and a low pressure side, which are reversed when the vehicle direction of motion is changed. Thus, while the HST is in the forward position, one side of the hydraulic circuit is under high pressure and the corresponding check valve is closed. At the same time the other side of the hydraulic circuit is under low pressure and that corresponding check valve is open and receives hydraulic fluid from gallery 37. When the HST is moved to reverse, the two sides switch and the formerly low pressure side is under high pressure and the corresponding check valve is now closed and the high pressure side is now under low pressure, opening that corresponding check valve.

When the HST is in the neutral position, there is no demand for make-up fluid. However, since the rotational speed of input shaft 25 does not vary, the fluid pressure supplied to gallery 37 from gerotor set 34 will remain constant, requiring fluid to be diverted back to sump 32 through relief passage 38 formed into center section 26. Relief valve 35, which may be located at any point in passage 38, controls the flow through passage 38. While the relief passage was selected to be through the center section in this embodiment of the invention, alternative passages can be formed through the porting plate 28 or through the housing 22; the locations of the relief passage in other than center section 26 are considered obvious variations of the invention. Also, relief valve 35 can be a variety of devices in configurations that are known in the art, and would remain in communication with passage 38 regardless of the location of that passage.

A charge pump embodiment of the invention incorporated in an HST will now be described in accordance with the accompanying drawings. As discussed above, another embodiment of this invention uses the charge pump in a stand-alone HST that is mounted within a housing separate from that of the components that transfer power from the HST to one or more axle shafts. In such an embodiment, the specifics of the charge pump and related structures shown in FIG. 3 can remain the same. FIGS. 8–13 show such a stand alone HST unit incorporating a charge pump embodiment of the invention. The general operation of the HST is identical to that described above and elements that are structurally identical to those described above are given identical numerals.

Figure 10:
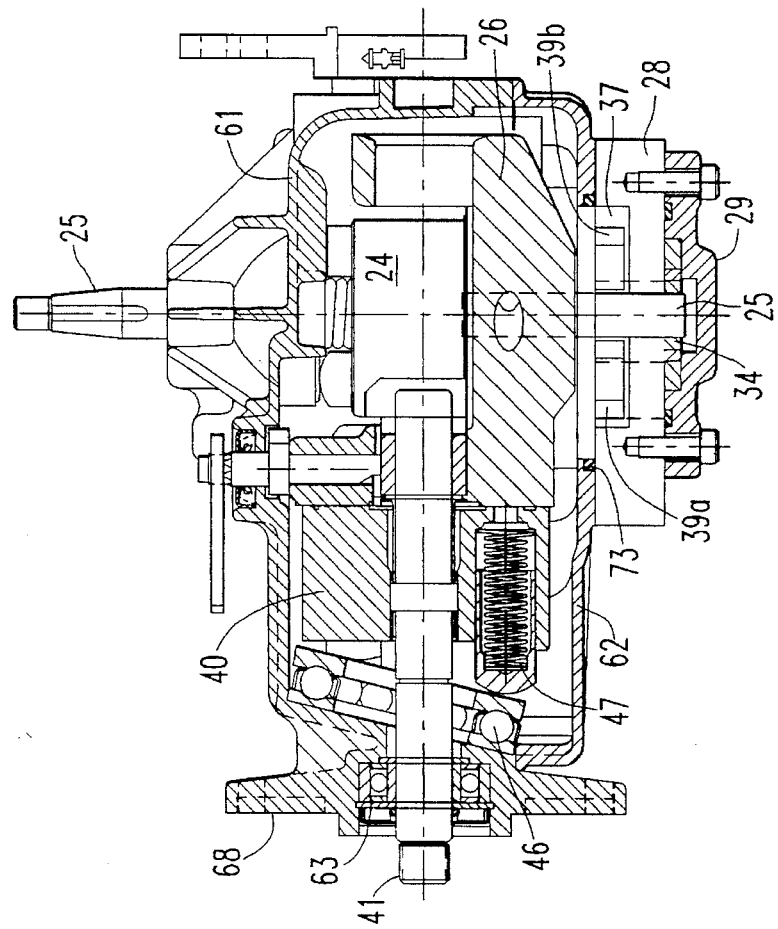
FIG. 10 is a sectional side view of the HST along the line 10—10 in FIG. 9.
Figure 9:
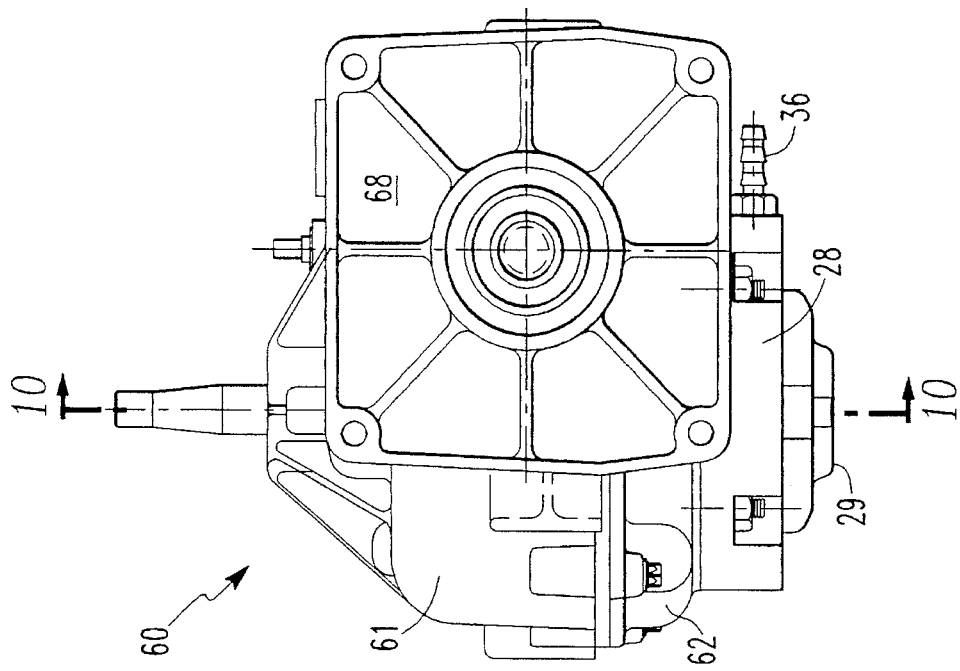
FIG. 9 is a further elevational end view of the HST shown in FIG. 8.
Figure 11:
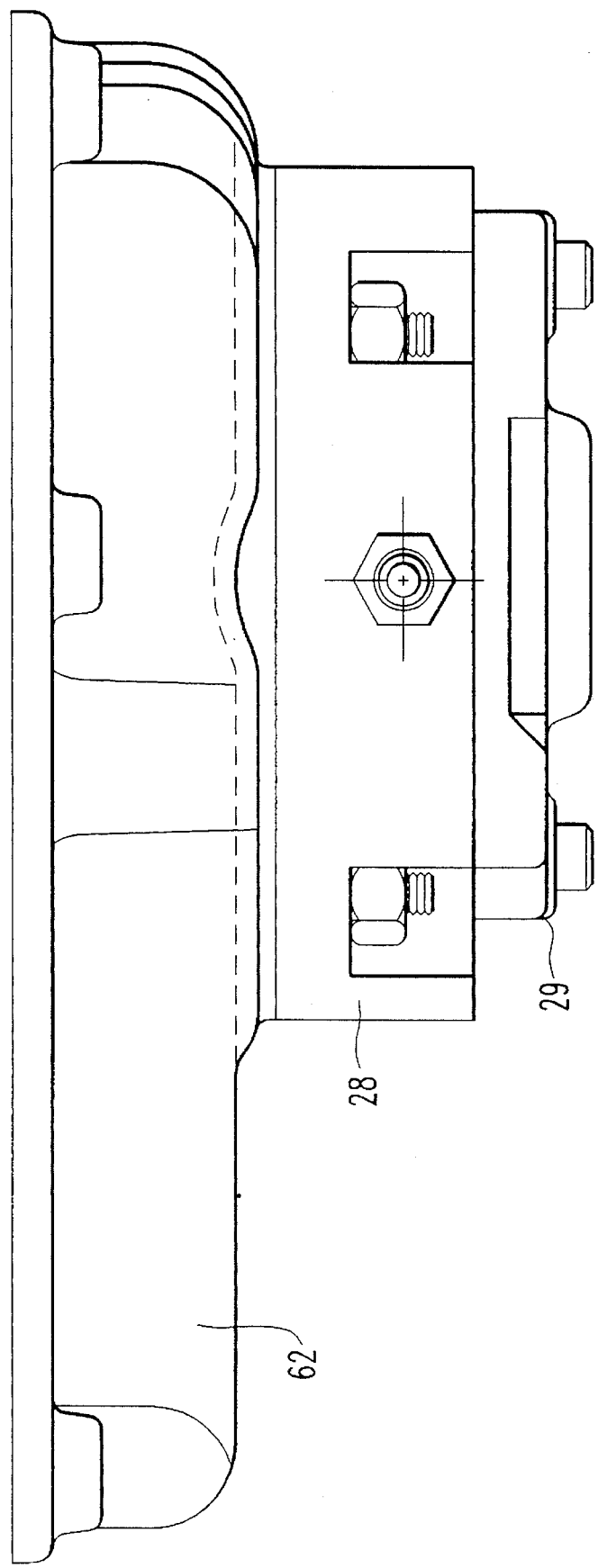
FIG. 11 is an elevational side view of the HST lower housing, porting plate and charge cover shown in FIG. 8.

As shown in FIGS. 9 and 10, HST 60 includes upper housing 61 and lower housing 62. In these figures, the rotation of motor 40 caused by action of the motor pistons 47 against fixed swashplate 46 drives output shaft 41. Output shaft 41 is supported by bearings 63, and extends through the transmission mounting plate 68 that is integrally formed with upper housing 61 so as to engage a separate axle driving apparatus (not shown).

Figure 8:
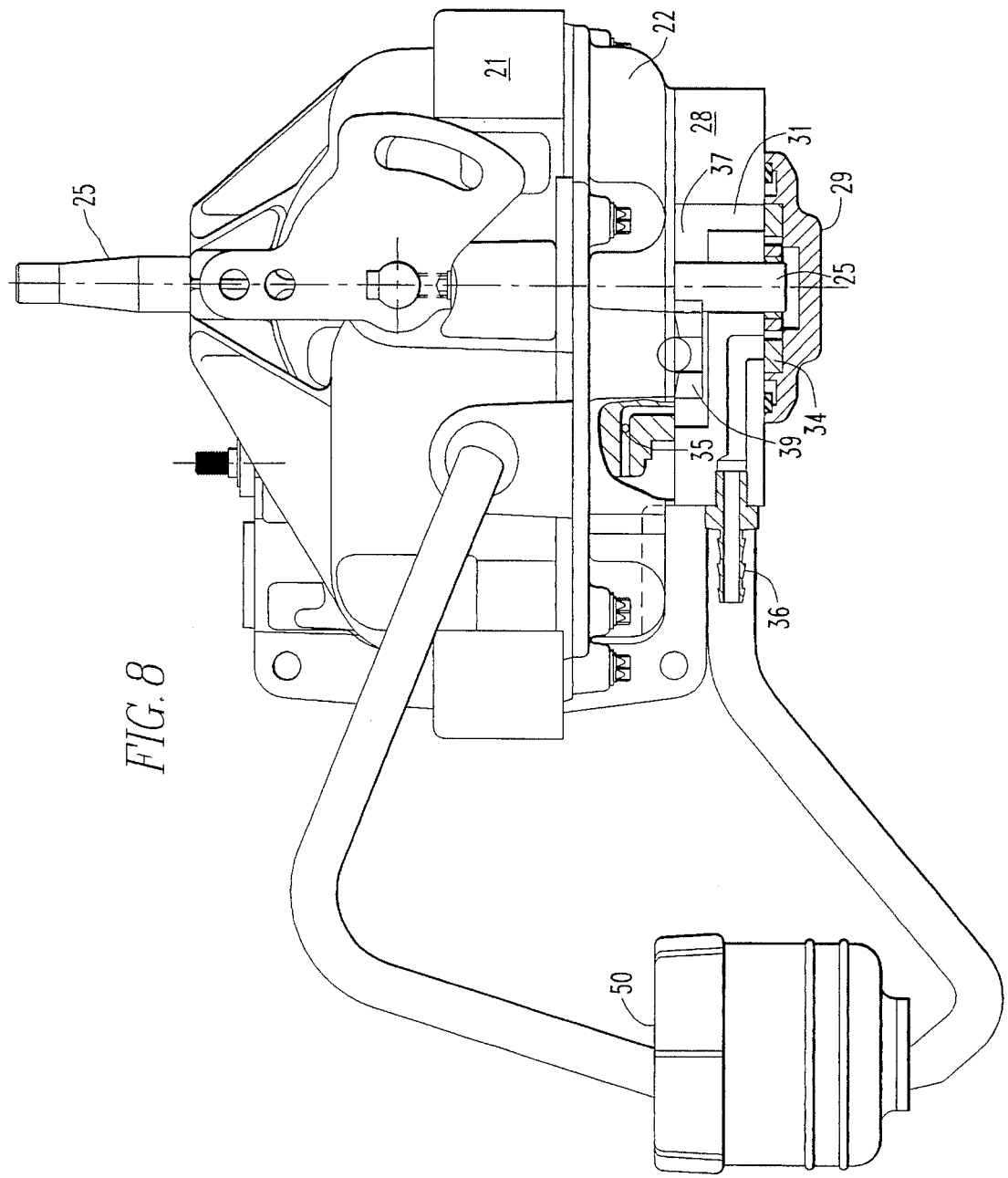
FIG. 8 is an elevational end view of an HST incorporating a charge pump in accordance with the present invention.

Inlet 36 can receive fluid from the housing of an axle driving apparatus to which the HST 60 is mounted. As shown in FIG. 8, fluid may also be received from a reservoir 50 that would be mounted to the support structure of the vehicle to which the HST and axle driving apparatus were attached. External reservoir 50 would then be in communication with and receive hydraulic fluid from sump 32. As in the IHT configuration, inlet 36 could also be in communication with sump 32 formed by the upper housing 61 and lower housing 62.

Figure 12:
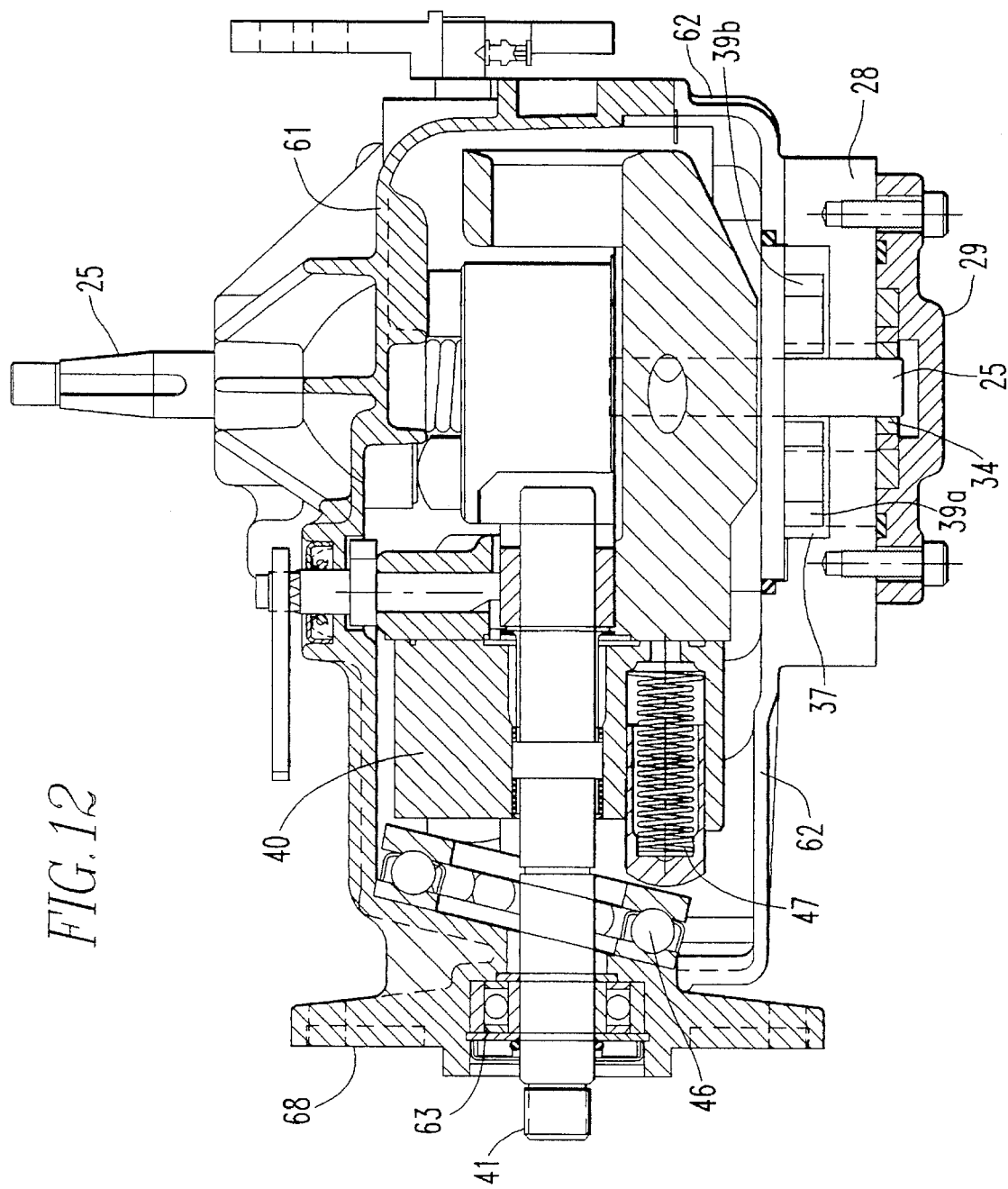
FIG. 12 is a sectional side view of another embodiment of an HST with a charge pump in accordance with the present invention incorporating the porting plate into the lower housing.
Figure 13:
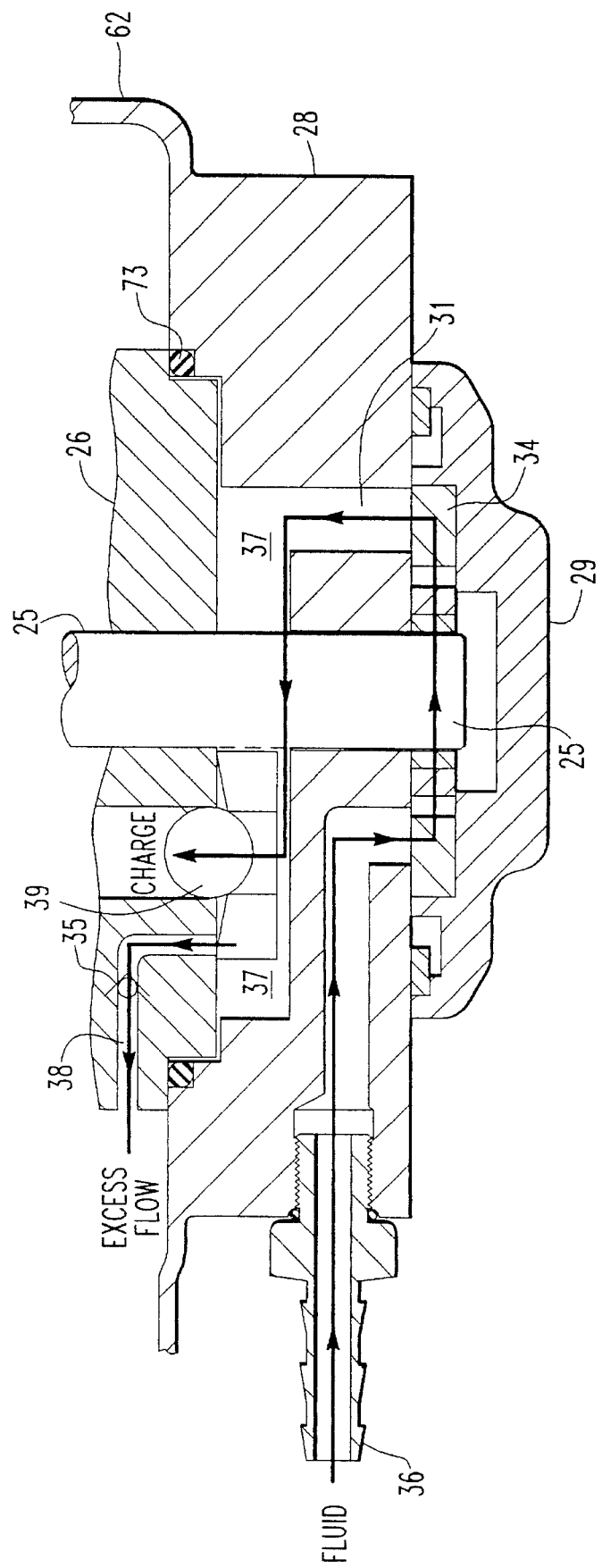
FIG. 13 is a sectional side view of the porting and charge pump detail of the embodiment shown in FIG. 12, with a typical hydraulic fluid flow path shown.

Another embodiment of the charge pump and lower housing is shown in FIGS. 12 and 13, wherein the inlet porting plate 28 is integrally formed with the lower housing 62, similar to the embodiment shown in FIG. 7. The explanation provided above for the IHT version of this embodiment is applicable for the HST. The same benefits that accrue to the IHT from this embodiment also accrue to the HST.

An auxiliary pump embodiment of the invention incorporated in an IHT or HST will be described in accordance with the accompanying drawings. A further embodiment encompasses the use of a pump that provides hydraulic fluid to power attachments and implements, known in the art as an auxiliary pump, in addition to the charge pump with an IHT or with a stand-alone HST that is mounted with a separate axle driving apparatus. Auxiliary pumps for use with HSTs are generally known in the art and are used to create hydraulic fluid flow to power attachments and implements such as a hydraulic mower deck lift. FIGS. 14 through 17 show an IHT 120 with a charge pump and auxiliary pump mounted thereon in accordance with this invention. The general operation of IHT 120 in this embodiment is substantially identical to that of the IHT depicted in FIGS. 1–5, and similar parts are indicated with the same numeral preceded by the numeral "1". For the sake of brevity, such parts will not be discussed herein except as such specifically relates to this embodiment of the invention.

Figure 19:
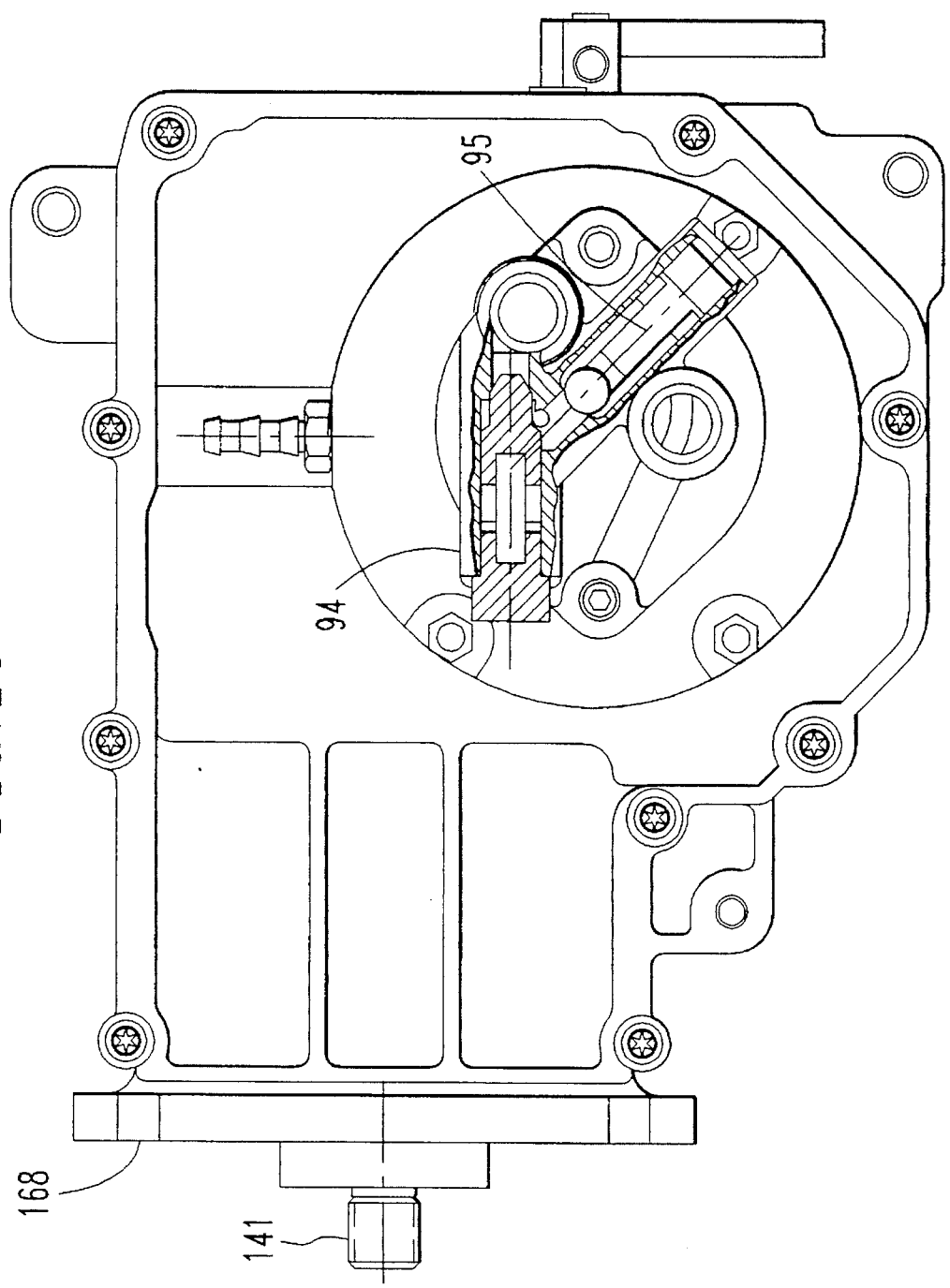
FIG. 19 is a bottom plan view of an HST incorporating an auxiliary and charge pump of the present invention, with a partial sectional view of the auxiliary pump cover.
Figure 20:
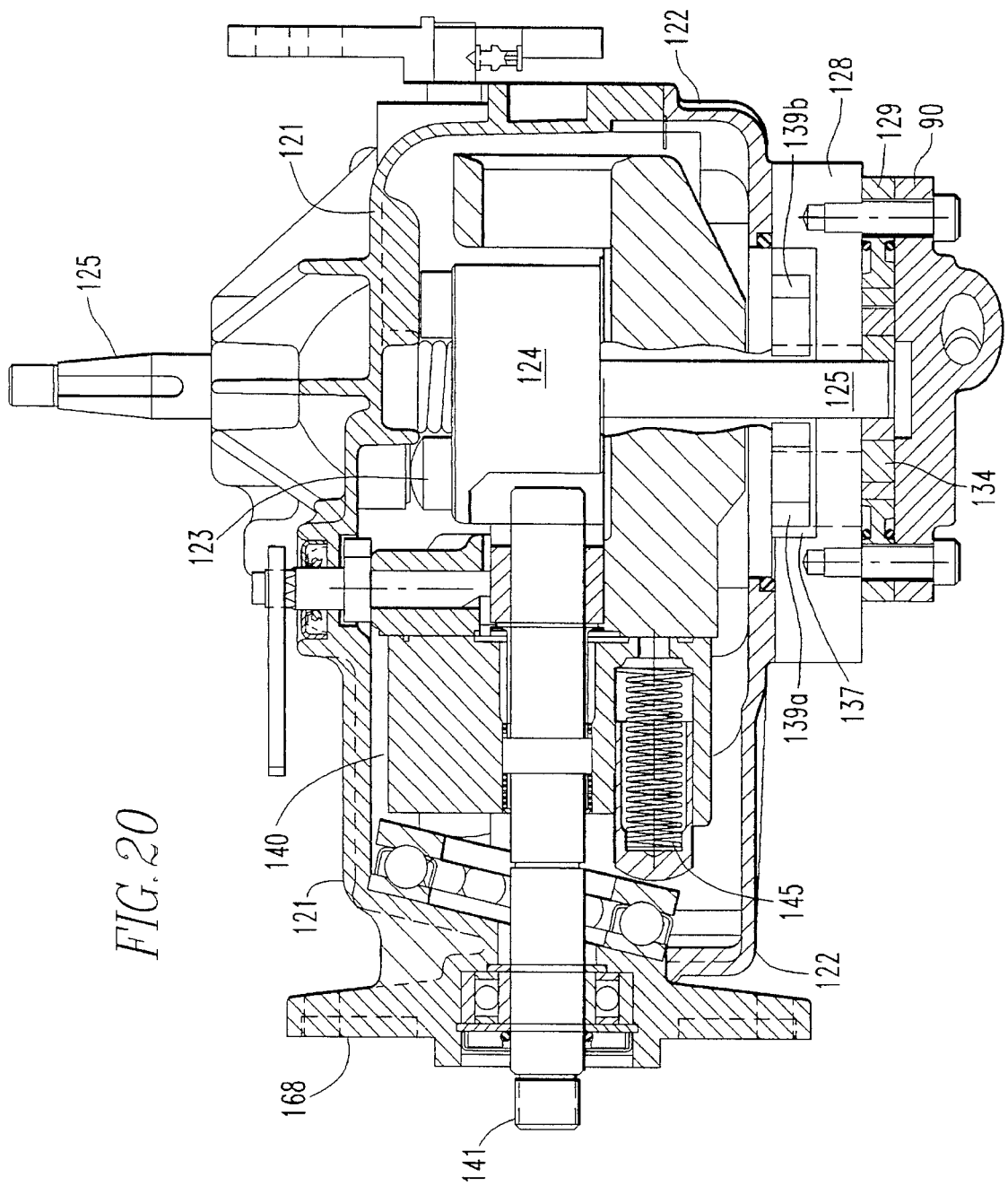
FIG. 20 is a sectional side view of an HST incorporating an auxiliary and charge pump embodiment of the present invention.

As discussed above, the auxiliary pump and charge pump combination disclosed herein can be used with an IHT, as shown in FIGS. 14–17, and can also be used with an HST, as shown in FIGS. 19 and 20, that has its housing attached to a separate axle driving apparatus (not shown). The general operation of the auxiliary pump and charge pump in FIGS. 19 and 20 is identical to that shown in FIGS. 14–17 and the following discussion is applicable to both applications of this embodiment. The mounting of the HST housing through transmission mounting plate 168 is the same as was described for FIG. 10 above.

Figure 14:
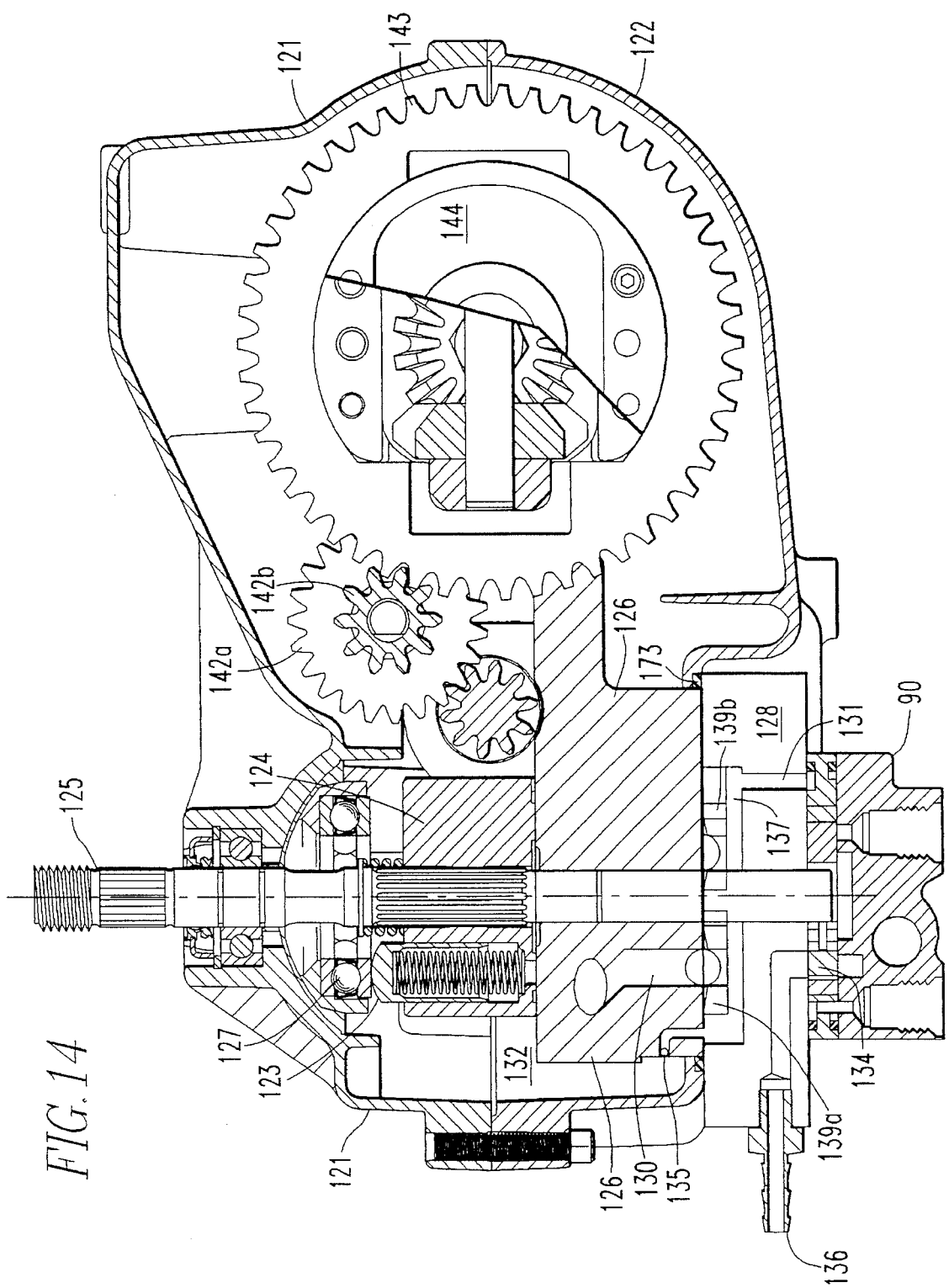
FIG. 14 is a sectional view of an IHT incorporating an auxiliary pump in accordance with another embodiment of the present invention.
Figure 15:
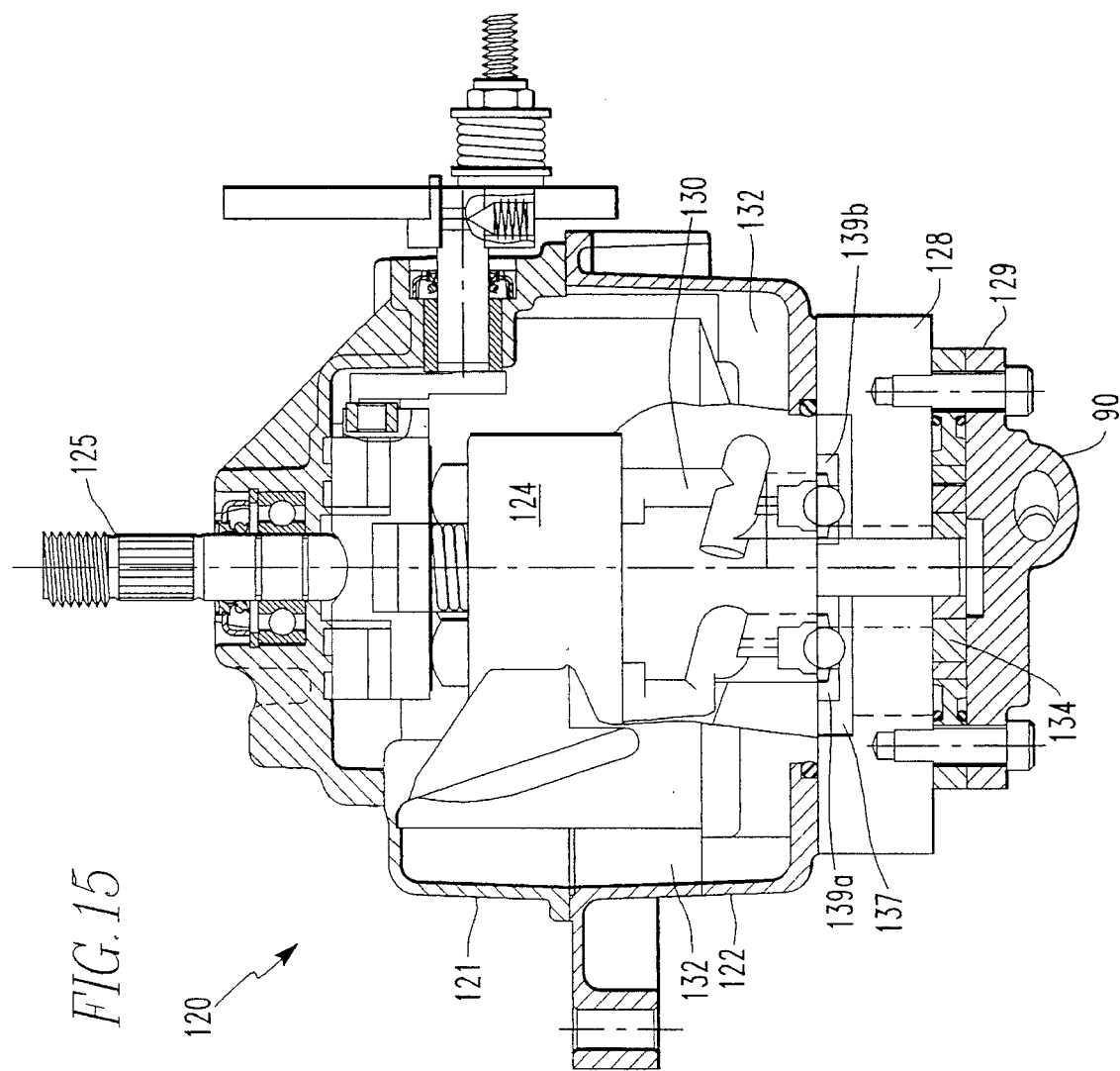
FIG. 15 is a sectional end view of the IHT shown in FIG. 14.
Figure 16:
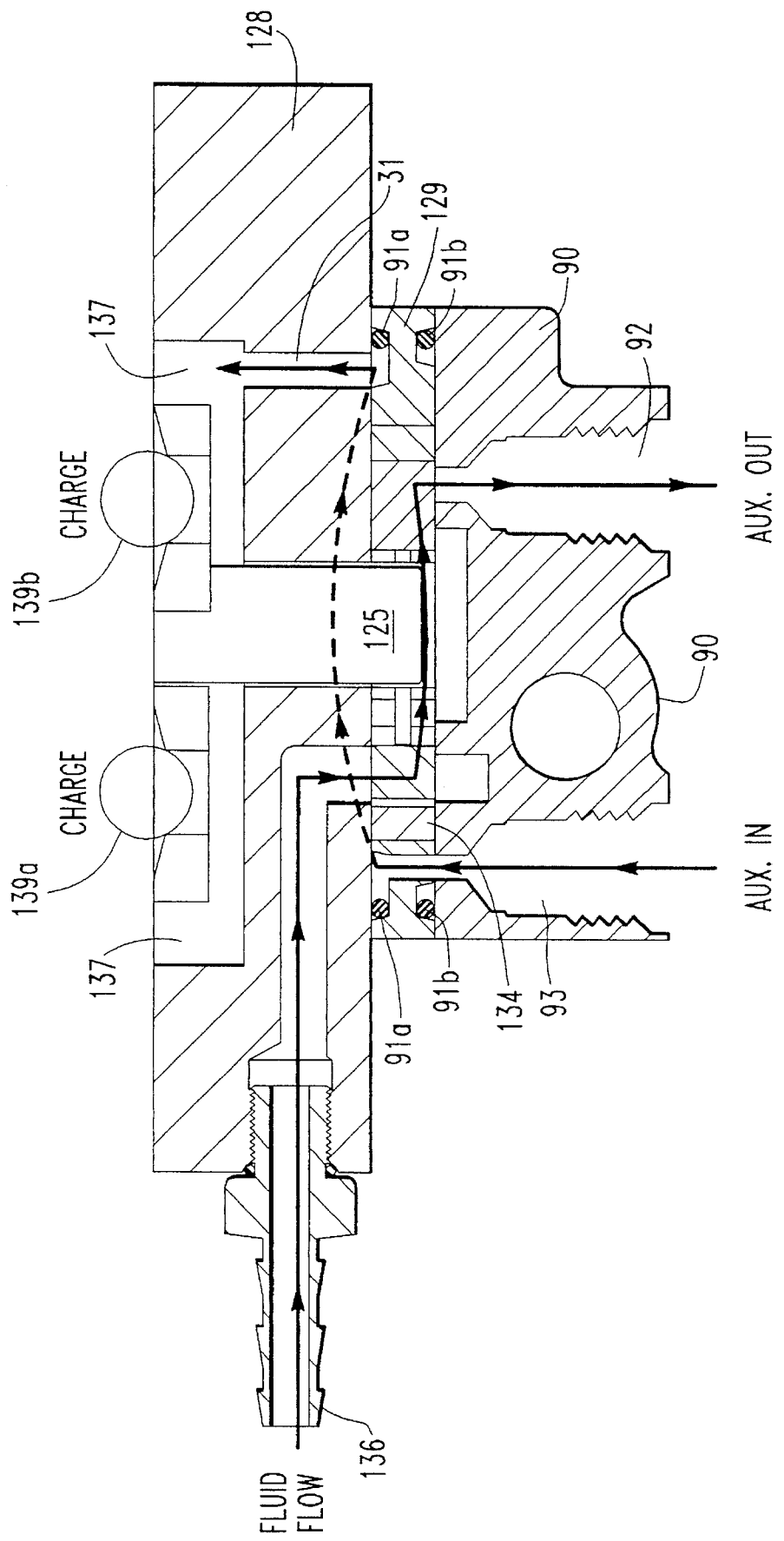
FIG. 16 is a sectional side view of the auxiliary pump used in connection with the IHT shown in FIG. 14 with a typical fluid path shown.

As shown in FIG. 14, center section 126 is attached to upper housing 121 such that the lower surface is generally at the same level as the external surface of lower housing 122. The center section 126 may be but need not be attached to the surface of lower housing 122 in this embodiment, but is positioned by the hole in the lower housing 122 through which the center section 126 extends. Inlet porting plate 128 is attached directly to lower housing 122. Center section 126 includes two check valves 139 that, as per the preceding discussion, may be threaded directly into the bottom of the center section or which may be incorporated in a separate plate. Gerotor housing 129 is mounted to porting plate 128 and houses gerotor set 134. Auxiliary pump cover 90 is then mounted to gerotor housing 129. O-rings 91*a* and 91*b* are used to prevent leakage of hydraulic fluid from the gerotor housing 129.

Rotation of gerotor set 134 created by rotation of input shaft 125 creates a suction at inlet 136. The hydraulic fluid drawn into gerotor set 134 is then forced into auxiliary outlet passage 92 under pressure to an implement circuit. The implement circuit returns hydraulic fluid via the auxiliary inlet passage 93, and then into gerotor housing 129. The gerotor housing provides a path for the hydraulic fluid that is connected to fluid passage 131 in the porting plate, and thus to gallery 137. The direction of fluid flow is generally shown by the arrows in FIG. 16.

Figure 17:
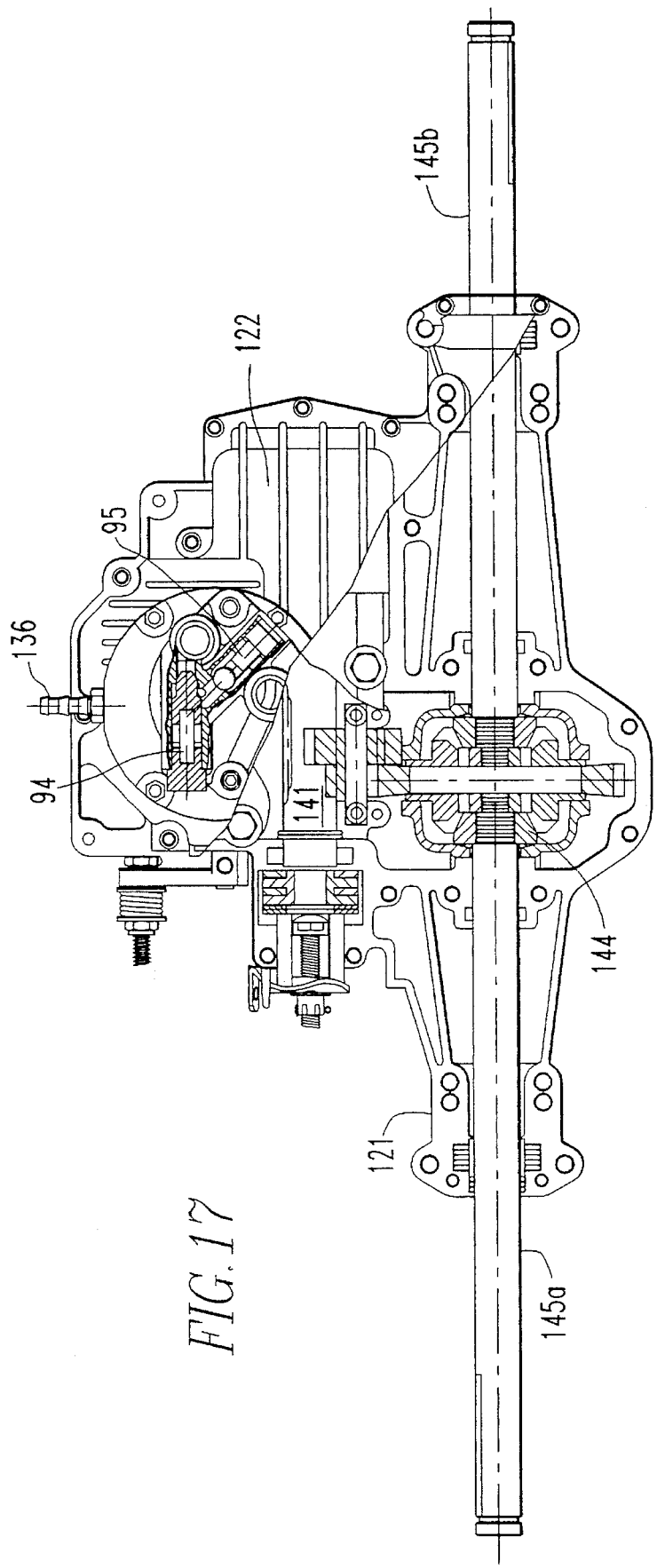
FIG. 17 is a partial sectional bottom plan view of an IHT as shown in FIG. 14, with the lower housing, porting plate and auxiliary pump cover partially cut away.
Figure 18:
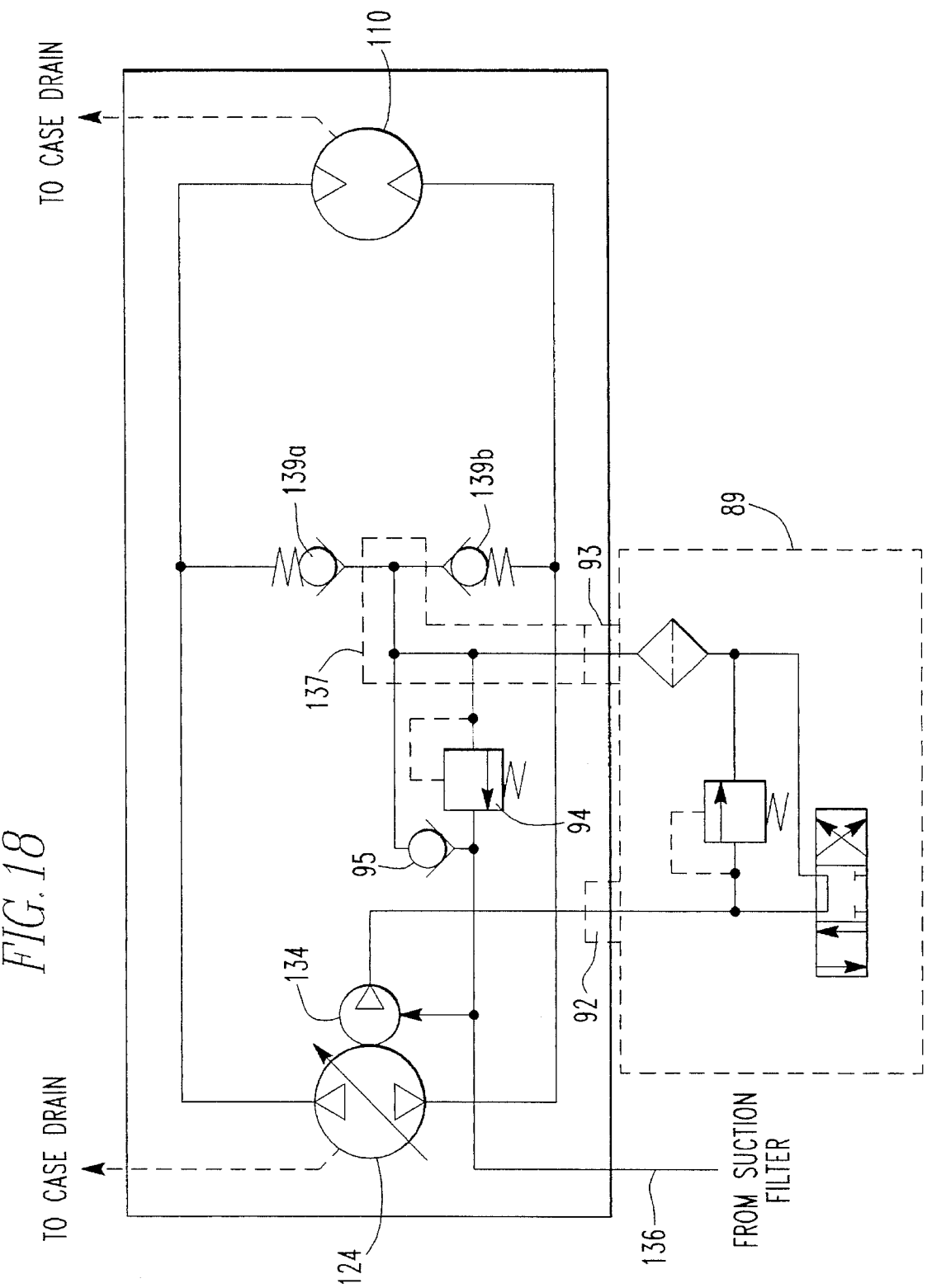
FIG. 18 is a hydraulic schematic of the embodiment shown in FIG. 14.

As shown in FIG. 17, auxiliary pump cover 90 also includes a charge relief valve 94 and a check valve 95. These valves can be implemented in a variety of configurations that are well known in the art, and are not unique to this invention. As the FIG. 18 hydraulic schematic indicates, charge relief 94 acts to maintain hydraulic pressure in gallery 137. Excess fluid not demanded by check valves 139*a* and 139*b* is diverted through charge relief valve 94 and returned to gerotor set 134, where it is again routed through auxiliary outlet passage 92 to the implement circuit 89. If pump 124 requires more hydraulic fluid than is available though implement circuit 89, then the suction caused in gallery 137 when either check valve 139*a* and 139*b* opens will cause check valve 95 to open to provide the additional hydraulic fluid required.

Figure 21:
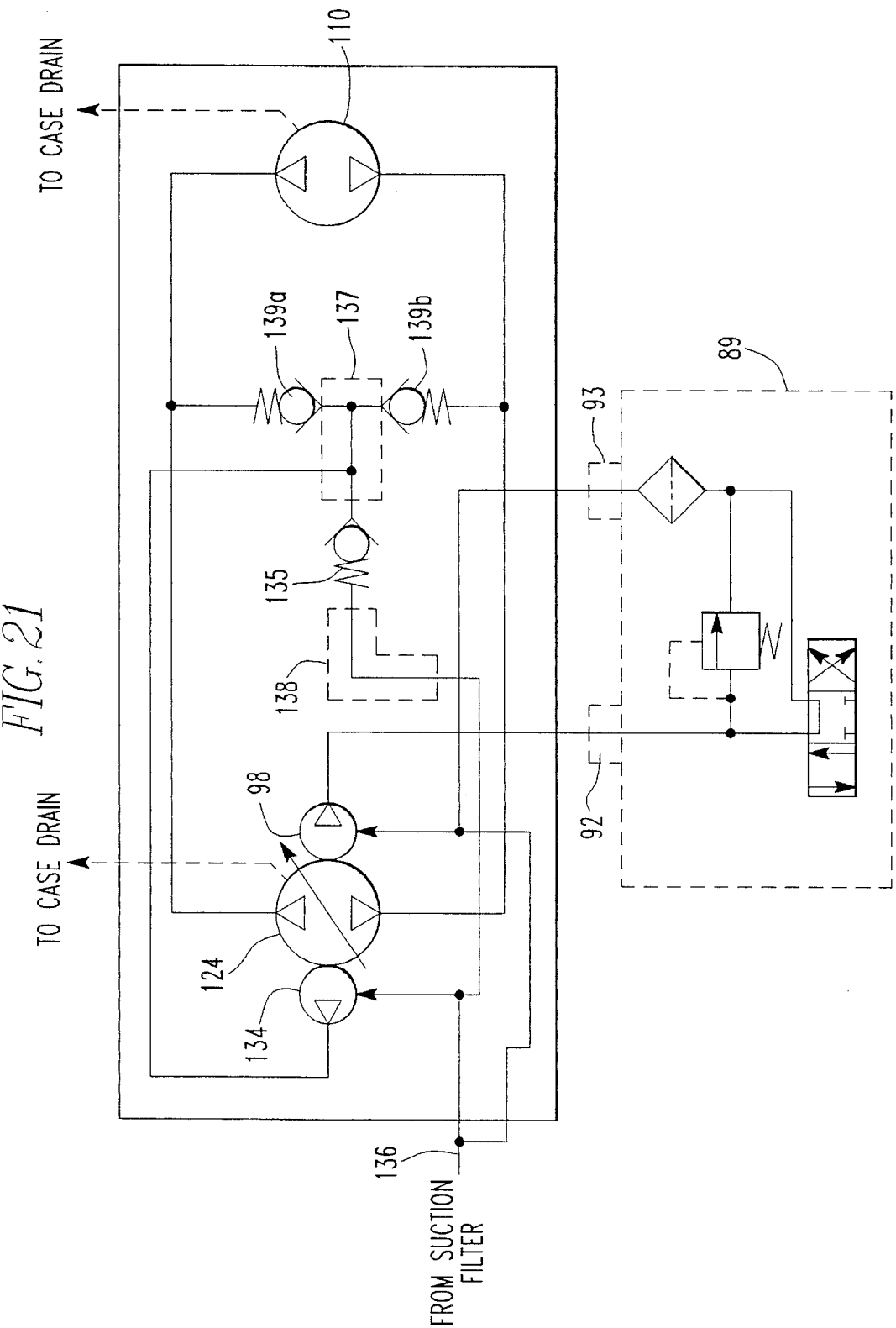
FIG. 21 is a hydraulic schematic of an embodiment that incorporates separate charge and auxiliary pumps.

Another embodiment shown in FIGS. 21–22 uses two completely separate gerotor sets 98 and 134 to serve as auxiliary and charge pumps, respectively. In this embodiment, the charge and auxiliary circuits are separate from each other, as shown in the hydraulic schematic in FIG. 21. An implementation of this embodiment is shown in FIG. 22, where input shaft 25 has been lengthened to extend through a modified charge cover 129, into the auxiliary pump 98. The operation of this embodiment follows the description above until return to the auxiliary cover 90, where flow is directed back into the line that leads to reservoir 50 or sump 132. The operation of the charge pump circuit follows the description provided in the charge pump section above.

It is to be understood that the above description should not be read as limiting the scope of this invention, as further features and benefits will be obvious to one skilled in the art. This invention should be read as limited by the claims only.

We claim:

1. An apparatus for transmitting power from a vehicle engine to an output axle, comprising:

a housing having an opening formed therein;

a hydrostatic transmission disposed substantially within said housing, said hydrostatic transmission comprising a center section, extending from within said housing and into communication with said opening, having hydraulic porting formed therein; a pump mounted on said center section and drivingly linked to said vehicle engine; and a motor mounted on said center section and hydraulically connected through said hydraulic porting to said pump, said motor being drivingly connected to an output shaft;

a sump containing hydraulic fluid in flow communication with said hydrostatic transmission for supplying hydraulic fluid thereto;

gearing means disposed substantially within said housing for transmitting power from said output shaft to said output axle;

a charge pump disposed adjacent to the external surface of said housing; and means for hydraulically connecting said charge pump and said hydrostatic transmission.

2. An apparatus as set forth in claim 1, wherein said housing comprises an upper casing and a lower casing connected along a plane which is generally parallel to the plane of said output axle.

3. An apparatus as set forth in claim 1, wherein said sump is integrally formed in said housing.

4. An apparatus as set forth in claim 1, wherein said sump comprises a reservoir external to said housing.

5. An apparatus as set forth in claim 1, wherein said means for hydraulically connecting said charge pump and said hydrostatic transmission comprises at least one check valve connected to a lower surface of said center section.

6. An apparatus as set forth in claim 5, wherein said check valve is mounted in a plate formed separate from said center section and secured thereto.

7. An apparatus as recited in claim 1, wherein said charge pump is mounted to the external surface of said housing.

8. An apparatus as recited in claim 1, wherein said center section is substantially "L"-shaped.

9. An apparatus for transmitting power from a vehicle engine to an output axle, comprising:

a housing;

a hydrostatic transmission disposed substantially within said housing, said hydrostatic transmission comprising a center section having hydraulic porting formed therein; a pump mounted on said center section and drivingly linked to said vehicle engine; and a motor mounted on said center section and hydraulically connected through said hydraulic porting to said pump, said motor being drivingly connected to an output shaft;

a sump containing hydraulic fluid in flow communication with said hydrostatic transmission for supplying hydraulic fluid thereto;

gearing means disposed substantially within said housing for transmitting power from said output shaft to said output axle;

a charge pump spaced from said center section; and means for hydraulically connecting said charge pump to said hydrostatic transmission including at least one check valve connected to a lower surface of said center section.

10. An apparatus as set forth in claim 9, wherein said housing comprises an upper casing and a lower casing connected along a plane which is generally parallel to the plane of said output axle.

11. An apparatus as recited in claim 9, further comprising a means for forming a gallery between said porting plate and said center section.

12. An apparatus as recited in claim 11, wherein said porting plate has internal porting formed therein, said charge pump comprises a gerotor drivingly connected to said vehicle engine, and said charge pump is hydraulically connected to said hydrostatic transmission through said internal porting.

13. An apparatus as recited in claim 9, wherein said center section is substantially "L"-shaped.

14. An apparatus for transmitting power from a vehicle engine to an output axle, comprising:

a housing comprising an upper section and a lower section, said lower section having housing porting formed therein;

a hydrostatic transmission disposed substantially within said housing, said hydrostatic transmission comprising a center section having hydraulic porting formed therein; a pump mounted on said center section and drivingly linked to said vehicle engine; and a motor mounted on said center section and hydraulically connected through said hydraulic porting to said pump, said motor being drivingly connected to an output shaft;

a sump containing hydraulic fluid in flow communication with said hydrostatic transmission for supplying hydraulic fluid thereto;

gearing means disposed substantially within said housing for transmitting power from said output shaft to said output axle; and a charge pump secured to the external surface of said lower section, said charge pump being hydraulically connected to said hydrostatic transmission through said housing porting.

15. An apparatus as recited in claim 14, wherein said center section is substantially "L"-shaped.

* * * * *